No. 791,971. Patented June 6, 1905.

UNITED STATES PATENT OFFICE.

HEINRICH WINTER, OF CHARLOTTENBURG, GERMANY.

PROCESS OF MAKING FIRST SUGAR AND WASTE MOLASSES IN ONE OPERATION.

SPECIFICATION forming part of Letters Patent No. 791,971, dated June 6, 1905.

Application filed February 17, 1903. Serial No. 143,819.

*To all whom it may concern:*

Be it known that I, HEINRICH WINTER, a citizen of the German Empire, residing in Charlottenburg, Germany, have invented certain new and useful Improvements in Processes of Making First Sugar and Waste Molasses in One Operation, of which the following is a specification.

The present invention separates the concentrated liquor of beet-roots, sugar-canes, or such like materials in one operation without obtaining any by-products into one first-class hard marketable granulated dry sugar and into liquid final waste molasses of such a low quotient of purity that no more sugar could be obtained from it with the customary centrifugal machines.

The drawbacks of the system hitherto in use, whereby three or four products of hard sugar are obtained, are well known. Besides the low prices which these after low products generally attained these latter required again the same apparatus and the same operations to which a great part of these masses have already been subjected in obtaining the preceding products and which caused many mechanical and chemical losses and a deterioration of the result. Furthermore, the working off has to take place partly after the crop is over, causing heavy expenses and other inconveniences.

All experiments and endeavors hitherto undertaken to solve the above-mentioned problem have been accompanied with little success. The question is not to decrease the quantity of the low products, but to do away with them altogether. This result could not be obtained hitherto for the following reasons: First, the evaporation and boiling down of the masse-cuites were never carried on far enough, and, second, the low purity generated in the mother-liquor of the masse-cuite after being lowered or decreased to a certain extent by the boiling operation was again brought up or increased by the operations of mixing and curing the masse-cuite necessary for obtaining the crystals, which increase is especially noticeable in the centrifugal machines. Consequently a fully-exhausted molasses was never obtained. With these basic principles in view my invention has for its object to carefully avoid the disadvantages set forth above. In other words, my improved process has for its object, first, to obviate these two erroneous operations, the action of which is the same, and, furthermore, to not alone bring down the mother-liquor surrounding the sugar-crystals to the lowest possible quotient of purity, but to retain this low quotient of purity down to the finishing operations necessary for making a marketable first sugar.

Sugar obtained by the well-known processes mentioned was of such poor quality that it was unmarketable, while by the use of my improved process washed and covered sugar of the best quality is obtained. To attain these objects, I proceed in the following manner: After boiling the liquor to grain in the vacuum-pan in the usual manner I draw in gradually toward the end of the operation to this "primary" masse-cuite such a low quantity of hot, if necessary, diluted, grain-freed runnings that the quotient of purity of the so-diluted and resulting mixed masses, hereinafter called "secondary" masse-cuite, is brought down or reduced to seventy-five or eighty-five per cent. purity with beets and to sixty-five to seventy per cent. purity with canes or such like materials. Then I continue the boiling operation until the mother-liquor surrounding the crystals has a purity of under sixty-five per cent. with beets and under forty per cent. with canes or such like materials.

Hitherto runnings and molasses have been drawn into the vacuum-pan in order to dilute the masse-cuite so as to make it more adapted to be thrown and handled easier in curing. Small quantities of runnings were also boiled down with the masse-cuite in order to lessen the quantity of low products to a certain degree and to obtain more first-sugar. However, the problem of making "first-sugar only, together with completely-exhausted molasses in one operation" without the redissolving of after low products and with satisfactory results has never been solved on account of the reasons above mentioned. Only after adding such large quantities to the vacuum-pan, as will be more particularly described hereinafter, in combination with a proper and scientific system of boiling down and working off the secondary masse-cuite can the desired result be attained.

The quantity of the runnings or molasses which is to be added or drawn into the vacuum-pan, hereinafter to be called "diluting-syrup," varies between pretty wide limits, according to the quality of the same and according to the character of the thick juice or the non-diluted primary masse-cuite, and is calculated as follows: X be volume per cent. primary masse-cuite; $y$ be volume per cent. diluting-syrup. Then if $Bm$ is the degree Brix of the diluting-syrup, $Bp$ is the degree Brix of the primary masse-cuite, $Qp$ is the quotient of purity of the primary masse-cuite, $Qs$ is the quotient of purity of the secondary masse-cuite, $Qm$ is the quotient of purity of the diluting-syrup, $Ds$ is the density (specific gravity) of the secondary masse-cuite, $Dp$ is the density (specific gravity) of the primary masse-cuite.

$$X = \frac{100\ Bm\ (Qs - Qm)}{Bp\ (Qp - Qs) + Bm\ (Qs - Qm)} \cdot \frac{Ds}{Dp}$$

$$y = 100 - X$$

Practically in a certain manufacture under given circumstances all letters are nearly constant figures, except $Qm$, which varies more or less for every strike of the boiling-pan. If, for instance, $Bp = 90$, which means $Dp = 1.485$, $Bm = 80$, $Qp = 90$, $Qs = 68$, $Ds = 1.45$, the formula is $$X = \frac{392\ (68 - Qm)}{99 + 4\ (68 - Qm)}$$

If, for instance, the quotient of purity of the diluting-syrup $Qm$ ready for use in a certain case is thirty-five, the boiling-pan has to be filled by $X = \frac{392.33}{99 + (4.33)} = 56$ per cent. of the total volume of the pan with primary masse-cuite and by $Y = 100 - X = 44$ per cent. of the total volume of the pan with the diluting-syrup or molasses. In this calculation the influence of the temperature is not taken into consideration, and the degree Brix has been taken equivalent to the dry matter, which is practically admissible for the purpose. From this example it is seen already that in cane industry the heating-surface of the vacuum-pan must be arranged so that a strike of primary masse-cuite can be obtained even within half the volume of the total capacity of the pan.

From the above it follows that the process will be practically executed with a variable quantity of strike of primary masse-cuite and a fixed quantity of secondary masse-cuite. The runnings-molasses is prepared before adding the same to the vacuum-pan—that is, is freed completely by heating and diluting with the required amount of water from the grain suspended therein and of its viscosity and, if necessary, purified and brought to a temperature which is a few degrees higher than that in the vacuum-pan, and after its composition has been determined a calculated amount is drawn into the vacuum-pan. To enable the ready calculation of this amount, tables may be arranged and used which are arranged as to be commensurate with local circumstances. It is essential that a good circulation be maintained in the pans. False grain is to be avoided entirely. As soon as the purity of the mother-liquor surrounding the crystals has been reduced to the extent required the secondary masse-cuite is discharged into the well-known mixing-coolers (crystallizers) and, again avoiding the formation of false grain, stirred or mixed until the mother-liquor for beet-sugar has a quotient of purity of fifty-five to sixty per cent. and the mother-liquor for cane-sugar has a quotient of thirty to thirty-five per cent.—that is, stirred until the mother-liquor is completely exhausted for practical purposes. The exhaustion of the molasses having been effected, the next operation consists in separating the crystals from the mother-liquor without changing the quality of the main mass of the mother-liquor. Hitherto the masse-cuites were mixed in mixers with syrups or molasses of higher quality than the mother-liquor or even in water, and also a good deal of grain used to be ground to a fine powder, which passes out with the runnings, increasing the purity of the runnings considerably. With my improved process only such mixers are used which contain arrangements like those in a small size crystallizer, which do not break or grind any grain. When dilution is necessary for the purpose of easier curing the mass, only fully-exhausted waste molasses should be used, which should be undiluted and of the same temperature as the cooled masse-cuite, so that no sugar is dissolved and at this stage of the process the purity of the mother-liquor not increased. A further drawback in the old processes was the following: Even if the quotient of purity in the mother-liquor was low it became high again in curing, as the layer of sticky syrup from the crystals had to be removed in the centrifugal machine by water or by a cleansing liquor of high purity, which was mixed with the runnings. With the present process these drawbacks are entirely done away with by the application of a special device for separating the runnings of different qualities in the centrifugal machines. Thereby a sharp and complete separation of the runnings of different qualities is feasible, which permits the collection of the mother-liquor entirely separated from the covering molasses. The former retains its low quotient of purity and can be separated entirely or partly out of the process as exhausted final molasses, while the latter or the cleansing liquor or runnings of higher quality are retained and used in the vacuum-pan. However, these high-class runnings will not as a rule be of sufficient quantity in order to supply sufficient syrup for the addition to the vacuum-pan to meet the requirements of the process. Therefore the mother-liquor of each strike is collected in a special vessel, kept separate, analyzed, and after consumption of the cleansing liquor so much of the same returned to those runnings whose purity is still above the lowest number for molasses, while only so much of the real exhausted waste molasses is added as is necessary—that is, after having used up the covering liquor from the centrifugal machines those runnings which contain the highest purity are returned to the vacuum-pan, while the real exhausted waste molasses is only made use of supplementary as far as necessary.

Any suitable centrifugal separating device may be used, preferably, however, that described and patented by me in United States Patent No. 731,258.

In the commencement of the campaign it is preferable to use molasses which has been left over from the preceding campaign.

I claim neither the drawing in nor addition of molasses-runnings or syrup into the molasses-pan generally, nor the cooling down of the masse-cuite, nor the separation by itself of runnings of different qualities in the centrifugal machines; but

I claim and desire to secure by Letters Patent—

The hereinbefore-described process of manufacturing first sugars only, wherein the masse-cuite being boiled in the vacuum-pan to grain is mixed with such a quantity of diluted and clarified runnings until the quotient of purity of the mixture is about eighty in beet industry and about sixty-five in cane industry, the quantities to be calculated and to vary according to the quality of the components, whereupon said mixture is boiled down until the mother-liquor shows a quotient of purity of about sixty-five with beets and about forty with canes after which the mother-liquor is brought down in purity as low as possible by cooling in crystallizers and kept in this state by using undiluted waste molasses to dilute the masse-cuite before drying, by distinctly separating the cleansing-syrup from the lower runnings in a classifying apparatus and keeping separately the different mother-liquors of each strike from one another in separate tanks, so that the better-quality runnings can be returned to the vacuum-pan, while the low-quality runnings as far as they are not required for supplying purposes are removed from the process as waste molasses.

In testimony that I claim the foregoing as my invention I have signed my name in presence of two subscribing witnesses.

HEINRICH WINTER.

Witnesses:
HENRY HASPER,
WOLDEMAR HAUPT.